United States Patent [19]

Lesgourgues

[11] 4,150,776
[45] Apr. 24, 1979

[54] METHOD OF JOINING METAL PARTS

[75] Inventor: Jacques Lesgourgues, Corbeil, France

[73] Assignee: Societe Nationale d'Etude et de Construction de Moteurs d'Aviation, Paris, France

[21] Appl. No.: 880,086

[22] Filed: Feb. 22, 1978

[30] Foreign Application Priority Data

Feb. 24, 1977 [FR] France .................................. 77 06149

[51] Int. Cl.² .............................................. B23K 19/00
[52] U.S. Cl. .................................... 228/194; 228/213; 29/419 R
[58] Field of Search ....................... 228/193, 194, 213; 29/419

[56] References Cited

U.S. PATENT DOCUMENTS 4,038,041   7/1977   Duvall et al. .................... 228/194 X
4,059,217   11/1977   Woodward ....................... 228/194 X

*Primary Examiner*—C. W. Lanham
*Assistant Examiner*—K. J. Ramsey
*Attorney, Agent, or Firm*—Bacon & Thomas

[57] ABSTRACT

The procedure according to the invention, for joining together stainless steel or superalloy parts, consists of placing an interface material, chosen from a group containing tin, indium, antimony, gallium and germanium or consisting of a combination of these elements, between the contacting surfaces of the parts, and then subjecting the entire assembly to heat treatment in a controlled atmosphere at a temperature greater than 900° C. but in every case less than the solidus point of the parts to be joined together. If the parts are not of the same nature, the lower solidus point will be the limiting temperature. The treatment lasts as long as necessary to permit the interface material to migrate and compounds or solutions to form, ensuring the diffusion brazing of the parts to be joined. The parts are held together under a moderate pressure during at least part of the treatment, so as to maintain their positions relative to each other and to promote the diffusion without causing deformation.

10 Claims, 7 Drawing Figures

METHOD OF JOINING METAL PARTS

BACKGROUND OF THE INVENTION

The invention pertains to procedures for joining stainless steel or superalloy parts by diffusion brazing and to the interface materials used in such joining procedures intended to form assemblies.

The term "superalloy" is understood to mean all materials which exhibit very great strength even at high temperatures and whose typical characteristic is that they basically consist of a solid nickel-chromium or cobalt-chromium solution, with the addition of aluminum, titanium and/or refractory materials to strengthen the solution and of carbon, boron (and/or) zirconium to promote ductility in creep rupture.

The term "interface material" refers to the filling material placed between the surfaces to be joined together. It consists of a layer interposed between the contacting surfaces of the parts to be joined and, more specifically, is in the form of a plating, a strip, or a plating-strip combination.

Diffusion welding in the solid state, under high pressure and heat, constitutes an attractive approach to the manufacture of parts having exact dimensions and high mechanical resistance to heat for use in aircraft engines. In particular, the applied pressure causes an intimate contact of the surfaces, which is necessary for the diffusion of the constitutents of the facing surface layers. In other words, if the joined parts are identical in composition and microstructure, it should be impossible to distinguish the interface from the other regions of the assembly by any physical, physico-chemical or mechanical test or examination.

Unfortunately, in addition to the difficulties encountered in obtaining suitable surface conditions to ensure perfect surface-to-surface contact so as to allow the solid state transport phenomenon to take place uniformly over the entire joint, the temperature rise preceding the welding operation causes certain constituents to migrate toward and become segrated in the surface layers of the parts, possibly hindering or even preventing the diffusion. The formation of such a diffusion barrier occurs particularly in superalloys containing, besides a non-negligible proportion of carbon, a relatively high titanium content (say, over 0.5%). Following diffusion welding, it can be observed, first, that the interface contains a nearly continuous border formed by segregated titanium compounds and consisting primarily of titanium carbide or carbonitride, and, second, that there is an absence of recrystallization. Mechanical tests confirm that joints produced in this manner are defective.

Previously proposed remedies associate the techniques of brazing, which is less sensitive to the precision of contact between the surfaces to be joined together, and of diffusion welding, in procedure known as "diffusion brazing".

A first category of diffusion brazing procedures calls for inserting, between the two parts to be joined together, a thin layer (preferably in powder form and held in a pyrolyzable organic binding material) of an alloy having the same basic components as the superalloy of the parts but also containing additives (fluxes) such that the liquidus temperature of said alloy is lower than the initial fusion temperature of the superalloy. The heating initially causes this layer to fuse and to become joined with the contacting surface layers of the parts, and then causes the local content of said flux (or fluxes) to diminish as a result of its migration in the neighboring regions of the parts.

In a second category of known procedures—which may be used in combination with the first—an intermediate layer of the base metal or metals of the superalloy, whose composition is such that it does not include any elements which produce structural hardening (such as titanium or aluminum), is formed in advance between the two parts. The bonding occurs by interdiffusion between the strip and the surface regions of the parts or by interdiffusion of the plated layers. This is followed by a homogenizing heat treatment. As an example of known procedures, see British Pat. No. 1,430,587.

SUMMARY OF THE INVENTION

The object of the present invention is to provide a procedure for joining stainless steel or superalloy parts by diffusion brazing, using as the interface material a filling metal of a different nature and function than those employed in the methods recalled above.

The procedure according to this invention not only makes use of a low-cost, easily applied interface material, but also incorporates the advantages of solid-state diffusion welding, which technique is thereby made more flexible in implementation, particularly with respect to the surface preparation requirements.

The invention results in part from observation of equilibrium diagrams pertaining to pairs of materials, one of which is the base metal of the parts or of one of the parts to be joined, while the other is the interface material used in the procedure according to this invention.

It has been observed that for certain pairs of materials and at a given treatment temperature compatible with the base metal, a solid solution and a liquid rich in the base metal are found next to each other.

As the temperature increases gradually up to the treatment temperature, one observes the successive formation of a phase rich in the interface material and then of a less rich phase, while the liquid (partially expelled by the constraint applied on the parts) becomes richer in the base metal. The liquid disappears gradually through diffusion and the concentration of the interface material in the base-metal solid solution decreases as it disperses within the base.

The interface material used in the procedure according to the present invention is chosen from a group or combines elements chosen from a group of materials which are generally regarded as contaminants, since they degrade ductility at high temperature, particularly through the formation of an intergranular liquid phase. In the envisaged application, this degradation can be avoided by precisely proportioning the quantity of interface material to be used and by judiciously selecting the heat treatment and the mechanical constraint to be applied to the parts.

The requirements for the choice of the material to be used in the procedure are linked to the fact that this material forms liquid alloys with the base metal to ensure the brazing during the first stage of the procedure. In the diffusion of the second stage, the liquid alloys formed in this manner drain off and intermetallic diffusion takes place, resulting in the formation of a solid-state weld.

A number of criteria have been established for the choice of interface material, heat treatment and mechanical constraint.

Considering first the interface material, it should be such that:

it has at least one liquid phase before the joining temperature is reached, preferably with the principal element of the base metal;

its vapor pressures are sufficiently low to tolerate oven heating under a controlled atmosphere;

it can be applied in thin layers between the surfaces or on the base metal, whether by electrodeposition, chemical deposition, in strip or powder form, by cathodic spray, vacuum evaporation or some other method.

Materials such as tin, indium, antimony, gallium and germanium comply with these three conditions and are thus suitable for use in the procedure according to the invention, whether in the pure state or in combination.

Calculations based on the application of the laws of diffusion and taking into account thermodynamic equilibrium diagrams have shown that the required isothermal solidification intervals of a metal (alloy) having a nickel or cobalt base are shorter when elements such as tin, indium, antimony, gallium and germanium are used than when more traditional elements such as boron are employed. For example, a 10-$\mu$m liquid joint will completely solidify within a period of the order of a few minutes for tin, while a minimum of one hour would be required with boron, the latter at a temperature of 1200° C.

The thickness of the liquid joint resulting from the dissolution of the base metal by the interface material may be limited by combining the latter with a matrix having a composition similar to that of the material of the parts to be joined, that is, consisting primarily of iron, nickel, nickel-chrome, nickel-cobalt, cobalt, etc., for example; for a liquid joint with an initial thickness of 5 $\mu$m, the thickness of the liquid zone after dissolution is approximately 18$\mu$m when pure tin is used, and approximately 6$\mu$m for a nickel-tin alloy 33% tin by weight.

The treatment temperature will depend on the nature of the interface material selected, but must always be high enough to permit the formation of intermetallic compounds or of sufficiently stable and strong solid solutions. Given these conditions, the treatment temperature will in all cases be higher than 1050° C. when tin is used as the interface material, higher than 900° C. for elements such as indium and gallium, and higher than 1000° C. for antimony and germanium. The limitation that the temperature must not exceed the solidus point of the parts to be joined is imposed by the necessity of not affecting the texture of the assembly in the region of contact, which would unfavorably affect the characteristics of the bond. In certain cases, the upper limit of the allowable temperature range should also be reduced in order to prevent irreversible transformations which would be harmful to the quality of the base material or in order to be compatible with the heat treatments of the base metal.

The heat treatment may be effected in a classical fashion, in an oven equipped with means to hold the assembly under pressure, or by a procedure of the resistance heating type, in which case a holding pressure is inherently maintained.

The nature of the parts to be joined—that is, whether they are made of steel or of superalloy—and the selected interface material may make it possible to carry out the heat treatment in the open air, particularly when resistance heating is used. In the case where it is sought to prevent any oxidation, the treatment will preferably be effected in a vacuum higher than 0.1 Pa [0.001 millibar], or in an inert atmosphere under partial vacuum or at atmospheric pressure.

In the case of simple shapes, the parts are held together in any traditional fashion. For parts having complex shapes—such as, say, when assembling turbine blades from half-shells—the holding pressure may be transmitted "hydrostatically", by placing the assembly inside a cavity containing a powder and applying the pressure on the free surface of the powder by means of a piston.

The purpose of this pressure is, first, to ensure that the parts are held in the relative positions they have at the beginning of the assembly procedure and, second, to limit the amount of liquid metal in the joint. Therefore, it is not essential that the pressure be maintained throughout the treatment, the treatment may thus be divided into a pre-joining operation under pressure, during which the isothermal solidification takes place and at the end of which there is no longer any liquid phase, followed by a treatment without pressure, to allow the diffusion to continue. The constraints generated by the holding pressure should enable the surfaces to be brought against each other without necessarily causing creep (contrary to the case in diffusion welding) and should not cause any significant deformation of the parts.

The treatment interval will depend particularly on the permissible range of treatment temperatures and the method of heating; it will be determined for each case according to the desired results.

Various additions, such as an organic binder, may be used to facilitate holding the filling metal and/or the parts in place. Other materials may in certain cases complete the action of the filling metal, including, for example, nickel, when joining steel or superalloy parts containing a certain percentage of titanium and/or aluminum to promote the dissolution of the carbides that tend to form during the treatment.

The characteristics and advantages of the procedure according to the invention will become more evident in the examples which follow.

The first three examples pertain to the application of the procedure to the joining of large parts made of superalloy.

The last two examples pertain to the application of the procedure according to the invention to the joining of an abradable material onto its support and are illustrated by the micrographs of FIGS. 1 through 7.

DESCRIPTION OF THE PREFERRED EXAMPLES

Figure 1:
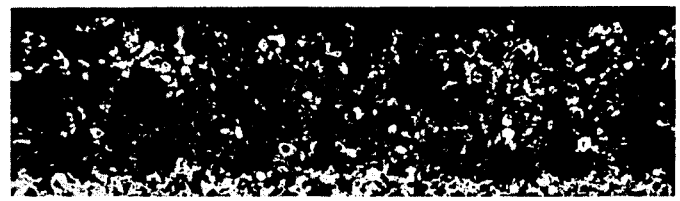
FIG. 1 is a photomicrographic section of an UCAR AB4 metal felt on a Nc22FeD support, with tin as the interface material (15X)

It is noted that abradable materials are those capable of wearing down by abrasion, used particularly as coatings in turbine housings in order to limit the clearance at the top of the vanes. They may be in honeycomb form, for example, or be porous materials of the felt or sintered powder types.

Example 1

The procedure according to this invention has been used successfully in assembling pieces of an alloy of Ni, NC19FeNb (Inconel 718).

The contact surface of one of the parts to be joined is given a 5 μm thick coating of indium. Prior to this, a coating of nickel or nickel-cobalt is deposited on the pieces to be joined together, in order to permit the carbides which are likely to form during the treatment, and which would create a diffusion barrier, to dissolve.

The treatment is carried out in two stages:

pre-joining, effected in an oven, under normal atmosphere, at 980° C. for four hours with a holding pressure of 20 MPa [200 bars], followed by a diffusion treatment in the oven, without constraints and under normal atmosphere, at 1010° C. lasting sixteen hours.

The chosen treatment temperatures thus lie within the permissible range for this type of alloy in the forged state, namely 960° C. to 1015° C.

A tempering treatment appropriate to the alloy is then carried out, at 720° C. for eight hours followed by 620° C. for eight hours.

No grain enlargement was observed as a result of the bonding process, and the strength tests performed revealed a good resistance of the assembly in the field of utilization.

Example 2

The procedure according to the invention was also applied to the joining of parts cast from the cobalt-base alloy KC24NWTa (MAR M509).

The part portions to be joined are cleaned with a flux or electrolytically polished and are then plated in a bath with a tin coating 5 to 10 μm thick. The treatment takes place in two stages:

pre-joining in the oven under vacuum, or resistance heating in an argon atmosphere, at 1200° C.; the length of the treatment depends on the procedure employed (one hour in the resistance-heating procedure, four hours in the oven case), the holding pressure being 35 MPa [350 bars] in the resistance-heating case and 10 MPa [100 bars] in the oven case;

followed by treatment with no holding pressure, intended to complete the diffusion, at 1230° C. during six hours; the KC24NWTa alloy goes into solution during this time.

This procedure makes it possible to manufacture vanes of KC24NWTa alloy starting from two half-shells without altering the internal cavities required for cooling, thanks particularly to the ease of readily and precisely measuring the needed quantity of filling metal.

Example 3

This example concerns the joining, by the procedure according to this invention, of parts made of COTAC-74 alloy (ONERA brand). This is a nickel-base matrix alloy with structural hardening, reinforced with niobium carbide fibers. The matrix has the following percentage composition: Co 0.2%, Cr 0.15%, W 0.10%, Al 0.03%, Ni (balance).

The joining was effected by means of the procedure according to the invention in the following fashion:

machining and scouring of the parts to be joined;

electrolytic deposition of 5 to 10 μm of tin on one of the surfaces to be joined;

pre-joining under vacuum in the oven at 1200° C. for one hour, under a holding pressure of 10 MPa [100 bars];

diffusion treatment combined with the hardening treatment, at 1300° C. for three hours in argon followed by 1100° C. for one hour in argon;

tempering treatment.

The results are similar to those obtained by classical diffusion welding, but the operational parameters are more flexible.

In comparison with other diffusion brazing procedures, the procedure according to the invention has the advantage of producing only a slight coalescence of the NbC fibers, without dissolving them.

Example 4

The support used in the assembly is a refractory austenitic alloy, namely the Nc22FeD known as HASTELLOY X, which has the following composition: Cr 22%, Mo 9%, Fe 18.5%, Co 1.5%, C 0.10%, Ni (balance).

In order to allow the abradable material to cool properly in operation, these supports sometimes contain small-diameter holes through which a cooling fluid circulates. Therefore, the the tests of this example were conducted both on supports with holes and on supports without holes.

Different types of abradable materials were tested on the supports, both with and without holes, made of Nc22FeD. These tests involved in part metal felts:

consisting of compressed and sintered grains of Ni-Cr-Al alloy; the thickness of the felt is 3.17 mm; this type is known by the designation UCAR;

composed of fibers of Nc22FeD refractory austenitic alloy compressed to a given density; the thickness of the felt is 3.17 mm; this type is known by the name FELT METAL;

of the porous nickel which is obtained from metal wool by heating in a nitrogen atmosphere to produce carbon fibers which are made conducting by depositing catalytic carbon by means of a flow of xylene-saturated nitrogen at high temperature. These fibers are electrolytically plated with nickel and then sintered under moist hydrogen in order to eliminate the carbon. The felt produced in this manner is composed of hollow fibers 10 to 20 μmin diameter and 1 to 2 mm long. It may be subjected to a chrome-aluminum plating treatment to provide protection against corrosion at high temperature.

The tests also involved:

a honeycomb of Nc22FeD (HATELLOY X) refractory austenitic alloy with the following dimensions: mesh, 1.57 mm; wall thickness, 0.08 mm; and height 3.17 mm.

Tests on a support of NC22FeD included the following stages:

depositing a tin coating on the useful portion of the support; this was a bath electrolytic coating held to a thickness of 10 μm;

mounting the abradable material on the support, subject to a holding pressure;

placing the assembly inside an oven for treatment under a vacuum of $10^{-3}$ Pa [$10^{-8}$ bar]; the oven was provided with a device which permits maintaining the assembly under pressure throughout the treatment; this pressure may vary according to the nature of the abradable material; it ranges from 2 to 20 bars;

heating the assembly to 1125° C. and maintaining this temperature for 5 minutes;

cooling under vacuum, with or without the retaining pressure which holds the parts together.

Photomicrographs 1 through 6 illustrate this first example.

It can be seen in FIG. 1 that the interface material does not affect the compactness of the felt.

Figure 2:
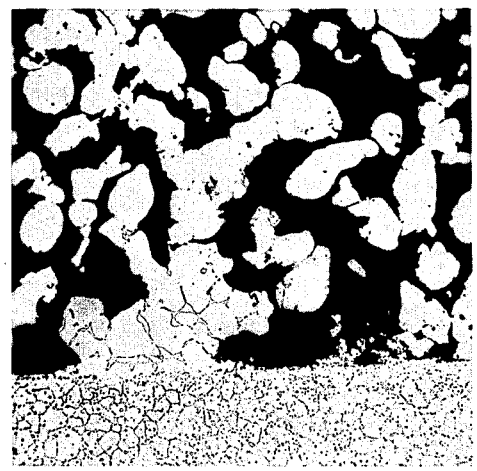
FIG. 2 is a photomicrographic section of an UCAR AB1 metal felt on a Nc22FeD support, with tin as the interface material (100X)

FIG. 2 is an enlarged view of a bond showing the coupling of the UCAR AB felt onto the NC22FeD support.

Figure 3:
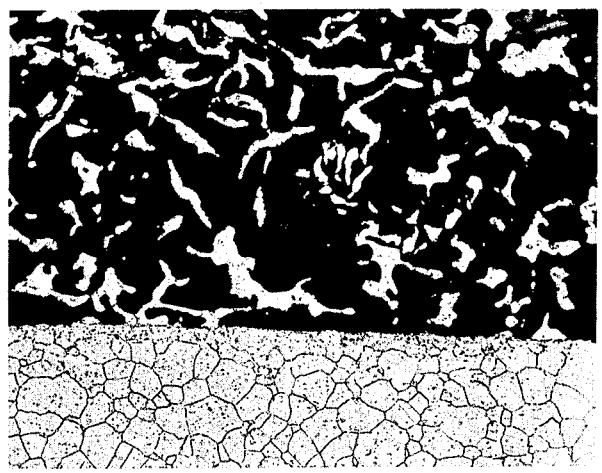
FIG. 3 is a photomicrographic section of a Felt Metal 509 metal felt on an Nc22FeD support, with tin as the interface material (100X)
Figure 4:
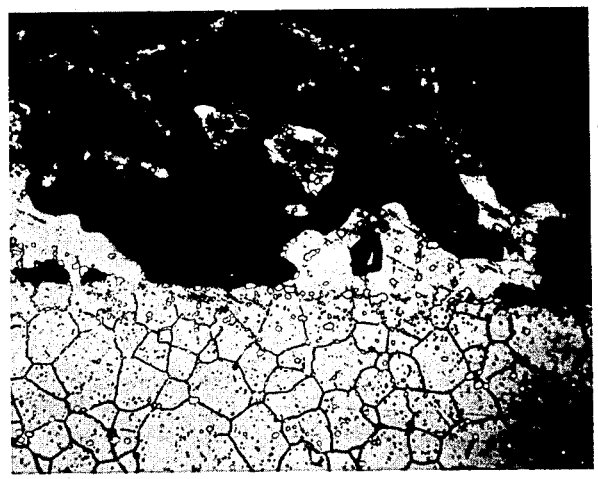
FIG. 4 is a photomicrographic section identical to FIG. 3 except for the 300X enlargement.

FIGS. 3 and 4 pertain to the mounting of the Felt Metal onto NC22FeD, also showing that the interface material does not alter the felt and that the bonding takes place correctly.

Figure 5:
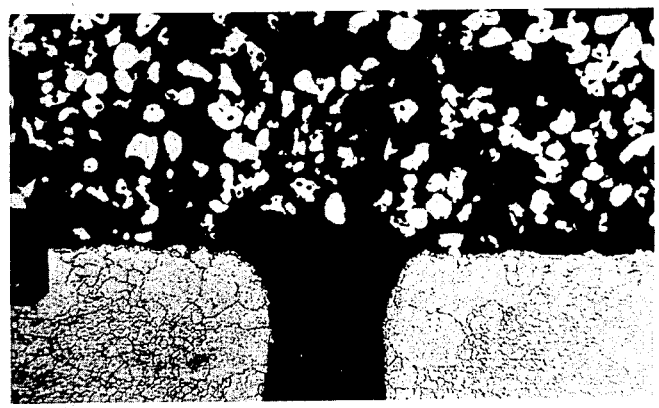
FIG. 5 is a photomicrographic section of an UCAR AB1 metal felt on a perforated Nc22FeD support, with tin as the interface material (50X)
Figure 6:
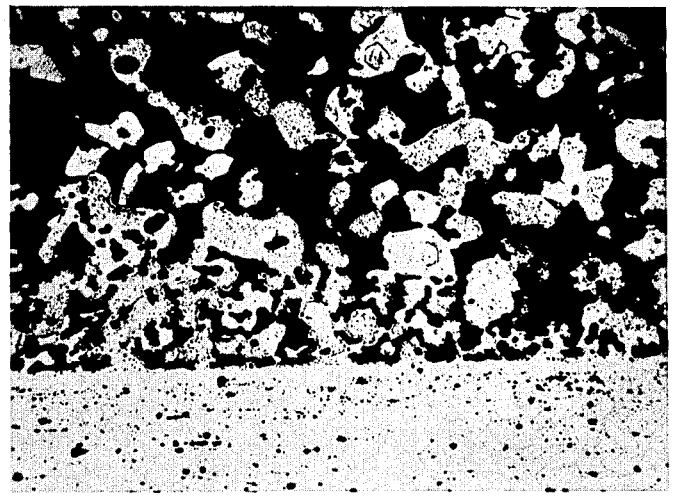
FIG. 6 is a photomicrographic section of an UCAR AB1 metal felt on an INCO 718 support, with indium as the interface material (100X)
Figure 7:
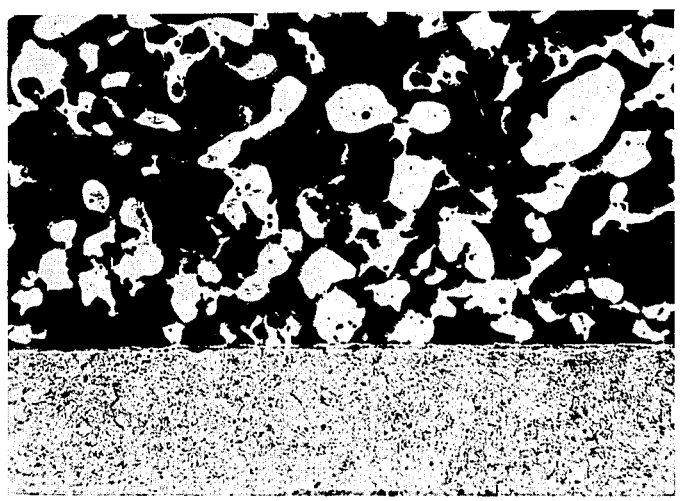
FIG. 7 is a photomicrographic section of an UCAR AB1 metal felt on a Z12C13 support, with indium as the interface material (100X).

FIG. 5 shows the mounting of the UCAR AB1 on the perforated NC22FeD support; the holes are not filled by the interface material but rather remain intact.

Furthermore, corrosion resistance tests conducted with the obtained assemblies show that the support-abradable material pairs generally have a higher temperature resistance than their elements taken separately, thanks to the protective effect of the filling metal.

Example 5

An abradable material of the metal felt type was mounted on two supports of different natures.

The first of the supports is made of a structural hardening alloy commonly called INCO 718, which has a hardening temperature of 960° C. with an allowable maximum of 1015° C. INCO 718 has the following composition: Cr 18.6%, Fe 18.5%, Cb 5.0%, Mo 3.1%, Ti 0.9%, Al 0.4%, C 0.04%, ni (balance).

The second support is a martensitic stainless steel, Z12C13, which should not exceed a temperature of 1015° C., and which has the following composition: C 0.12%, Cr 13%, Fe.

The metal felt is an UCAR consisting of compressed and sintered grains of Ni-Cr-Al alloy; the thickness of the felt is 3.17 mm.

The interface material compatible with the supports is indium, since it allows a treatment temperature consistent with the hardening temperature of the support.

The interface material is deposited electrolytically in a layer to a thickness of 10 μm. This coating is deposited on supports which have been previously plated with nickel in a bath to a thickness of 5 μm.

The operational procedure comprises the following steps:

conduct a bath nickel plating on the useful portion of the support;

effect an electrolytic deposit of indium in a layer on the previously nickeled support;

mount the abradable material on the support and apply a holding pressure;

place the assembly inside an oven provided with a device which permits a holding pressure to be applied on the assembly throughout the treatment; this pressure is of the order of 2 to 10 bars (0.2 to 1 MPa);

effect the treatment under a vacuum of $10^{-3}$ Pa [$10^{-8}$ bar] at a temperature of 980° C. for 1 to 4 hours;

cool the assembly under vacuum, with no holding pressure on the parts.

Photomicrographs 6 and 7 show that the felt is not altered by the interface material and that the binding is correct.

Oxidation tests have made it possible to determine a working temperature of approximately 650° C. for each of the produced assemblies.

The results obtained for each of the examples presented above derive from the fact that the filling metal is chosen so as to be able to be easily and precisely proportioned and to diffuse in the base metal in minute proportions which do not affect the properties of any of the joined materials.

I claim:

1. The method of solidly joining parts made of stainless steel or of superalloy, comprising the steps of: interposing a layer of an interface material of at least one selected from a group containing tin, indium, antimony, gallium and germanium between contacting surfaces of the parts, subjecting the assembly to a heat treatment under a controlled atmosphere, at a temperature higher than 900° C. but lower than the solidus point of the parts to be joined, for an interval of time sufficient to permit the migration of the interface material and the formation of compounds or solutions which ensure the diffusion brazing of the parts to be joined, and during at least a portion of the treatment, subjecting the parts to a moderate holding pressure to maintain their relative position and to promote the diffusion without causing deformation.

2. The method of solidly joining parts made of stainless steel or of superalloy, comprising the steps of: interposing a layer of an interface material consisting of a combination of materials selected from a group containing tin, indium, antimony, gallium and germanium between the contacting surfaces of the parts, subjecting the assembly to a treatment under a controlled atmosphere, at a temperature higher than 900° C. but lower than the solidus point of the parts to be joined, for an interval of time sufficient to permit the migration of the interface material and the formation of compounds or solutions which ensure the diffusion brazing of the parts to be joined, and during at least a portion of the treatment, subjecting the parts to a moderate holding pressure to maintain their relative position and to promote the diffusion without causing deformation.

3. The method according to claim 1, characterized by the fact that the interface material is combined to a matrix whose composition is similar to that of the parts to be joined together.

4. The method according to claim 1, characterized by the fact that the heat treatment successively comprises a pre-joining stage wherein the parts are held together under pressure and at the end of which there remains no liquid phase at the interface of the parts, and a second stage to complete the diffusion phenomenon, wherein the pressure applied on the parts during the pre-joining is removed.

5. The method according to any one of claims 1 through 4, characterized by the fact that the interface material is tin and that the treatment temperature is higher than 1050° C.

6. The method according to claim 1, characterized by the fact that the interface material is one of antimony and germanium and that the treatment temperature is higher than 1000° C.

7. The method according to claim 1, characterized by the fact that the contacting surfaces of the parts are plated with nickel before the assembly.

8. The method according to claim 1, characterized by the fact that the heat treatment takes place in a vacuum of less than 0.1 Pa [$10^{-6}$ bar].

9. The method according to claim 1, characterized by the fact that the treatment takes place in an inert atmosphere.

10. The method of claim 1 wherein said joining of parts comprises binding an abradable material, that is, a material capable of wearing down by abrasion, of the group consisting of the honeycomb type, refractory material, the porous type produced from sintered powders, and of felt based on refractory metals, onto a metallic support of one of steel and superalloy.

* * * * *